United States Patent
Vogt

(10) Patent No.: US 8,656,158 B2
(45) Date of Patent: Feb. 18, 2014

(54) SYSTEM AND METHOD FOR ACCESS NETWORK MULTI-HOMING

(75) Inventor: Christian Vogt, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 505 days.

(21) Appl. No.: 12/665,779

(22) PCT Filed: Jun. 11, 2008

(86) PCT No.: PCT/IB2008/001507
§ 371 (c)(1),
(2), (4) Date: Apr. 28, 2010

(87) PCT Pub. No.: WO2009/001183
PCT Pub. Date: Dec. 31, 2008

(65) Prior Publication Data
US 2010/0211775 A1    Aug. 19, 2010

Related U.S. Application Data

(60) Provisional application No. 60/945,674, filed on Jun. 22, 2007.

(51) Int. Cl.
*H04L 29/06* (2006.01)
*G06F 9/00* (2006.01)
*G06F 15/173* (2006.01)

(52) U.S. Cl.
USPC .................. 713/163; 726/12; 709/238

(58) Field of Classification Search
USPC .................. 713/163; 726/12; 709/238
See application file for complete search history.

(56) References Cited

U.S. PATENT DOCUMENTS

| | | | |
|---|---|---|---|
| 8,000,704 B2 * | 8/2011 | Arkko et al. | 455/435.1 |
| 2002/0133607 A1 * | 9/2002 | Nikander | 709/229 |

(Continued)

OTHER PUBLICATIONS

Bagnulo et al: An incremental approach to IPv6 multihoming: Computer Communications, Elsevier Science Publishers BV, Amsterdam, NL. vol. 29, No. 5, Mar. 6, 2006. pp. 582-592.

(Continued)

*Primary Examiner* — Techane Gergiso

(57) ABSTRACT

A system and method for generating a set of IP addresses for access multi-homing in an Internet access network. A generating host obtains from the network a set of IPv6 subnet prefixes for a plurality of available Internet Service Providers, ISPs. The generating host generates a single IPv6 interface identifier from the subnet prefixes and cryptographically binds the subnet prefixes with the single IPv6 interface identifier. A remote peer verifies that all of the IP addresses belong together by independently generating the IPv6 interface identifier from the same set of subnet prefixes and comparing the result with the IPv6 interface identifier generated by the generating host.

13 Claims, 5 Drawing Sheets

(56) References Cited

U.S. PATENT DOCUMENTS

| | | | |
|---|---|---|---|
| 2002/0152384 A1* | 10/2002 | Shelest et al. | 713/176 |
| 2003/0179750 A1* | 9/2003 | Hasty et al. | 370/390 |
| 2004/0008845 A1* | 1/2004 | Le et al. | 380/277 |
| 2004/0054807 A1* | 3/2004 | Harvey et al. | 709/243 |
| 2004/0057579 A1* | 3/2004 | Fahrny | 380/44 |
| 2004/0242233 A1* | 12/2004 | Lutgen | 455/445 |
| 2004/0246931 A1* | 12/2004 | Thubert et al. | 370/338 |
| 2005/0041675 A1* | 2/2005 | Trostle et al. | 370/401 |
| 2005/0188194 A1* | 8/2005 | Fascenda | 713/155 |
| 2006/0020796 A1* | 1/2006 | Aura et al. | 713/168 |
| 2006/0020807 A1* | 1/2006 | Aura et al. | 713/176 |
| 2006/0104243 A1* | 5/2006 | Park | 370/331 |
| 2007/0250640 A1* | 10/2007 | Wells | 709/239 |
| 2007/0253431 A1* | 11/2007 | Park et al. | 370/395.52 |
| 2008/0222386 A1* | 9/2008 | Chiang et al. | 711/216 |

OTHER PUBLICATIONS

Bagnulo M, Garcia-Martinez A; Azcorra A: "Efficient security for IPv6 multihoming" ACM SIGCOMM Computer Communications Review, vol. 35, No. 3, Apr. 2005, pp. 61-68.

Marcelo Bagnulo et al: "BGP-like TE Capabilities for SHIM6" Software Engineering and Advanced Applications, 2006. SEAA '06. 2$^{nd}$ EUROMICRO Conference on IEEE, PI, Aug. 1, 2006, pp. 406-413.

* cited by examiner

SYSTEM AND METHOD FOR ACCESS NETWORK MULTI-HOMING

This application claims the benefit of U.S. Provisional Application No. 60/945,674, filed Jun. 22, 2007, the disclosure of which is fully incorporated herein by reference.

TECHNICAL FIELD

The present invention relates generally to communications networks, and in particular, to a system and method for access network multi-homing utilizing a cryptographically bound set of IP addresses.

BACKGROUND

Access network multi-homing is an existing technique in which an access network connects to multiple Internet Service Providers (ISPs) simultaneously in order to increase Internet connectivity bandwidth and to increase robustness to ISP failures. Traditionally, there have been two principal approaches for access network multi-homing. One is to advertise the addressing space of a multi-homed access network independently of each of its ISPs' addressing space in the global routing system, thus adding a separate routing table entry for the access network. The other approach is to let hosts select an ISP by enabling them to dynamically switch between IP addresses from ISP-dependent addressing spaces. Each addressing space is then advertised to the global routing system as part of the respective ISP's addressing space.

A third, more recent, approach to access multi-homing provides a level of indirection between the addressing space that access networks use internally and the addressing space that is used for carrying packets through transit space. Some indirection techniques require an address space mapping at the border of every access network. Other indirection techniques require only multi-homed access networks to provide a mapping on their border and to also subscribe to a (reverse) mapping that takes place at an indirection point somewhere in transit space.

All of these approaches lack at least one of the following desired properties:

1. Global routing table preservation. The global routing table should grow linearly with respect to the number of ISPs rather than linearly with respect to the number of access networks.

2. Traffic engineering. An access network should be able to force ingress and egress traffic to pass via one particular ISP of the ISPs with which it multi-homes.

3. Host preferences. A host should still be able to suggest to the access network, an ISP of its own choice that it would prefer its traffic to pass through.

4. ISP changes. It should be possible to quickly reroute traffic, in both directions, via an alternative ISP.

5. Network reconfiguration costs. An access network operator should be able to change its set of ISPs without costly reconfiguration of network devices.

6. Routing performance. Traffic characteristics such as packet propagation latencies, packet loss probabilities, or jitter should not change.

7. Transition. There should be a transition path for incremental deployment, which allows upgraded parts of the Internet to communicate with legacy parts.

8. Incentives for deployment. Deployment of a technique should yield direct benefits to those entities investing in the deployment.

9. Integrability. Where possible, a technique for access network multi-homing should be integrable with mobility techniques and, in the long run, possibly also host identity techniques.

The technique of advertising access networks' addressing spaces separately in the global routing system fails to preserve the global routing table, and does not enable hosts to express a preference with respect to an ISP for their traffic. Giving hosts the ultimate decision on which ISP their traffic is routed through, in turn, conflicts with the traffic engineering strategies of access networks. Indirection techniques that require mappings at the border of every access network have disadvantages regarding transition paths and deployment incentives. Indirection techniques also face unanswered questions with respect to how mappings can be maintained efficiently, or how they can be updated rapidly to support access networks in switching to an alternative ISP. On the other hand, indirection techniques that use an indirection point somewhere in transit space incur adverse impacts on routing performance.

SUMMARY

Current techniques for access multi-homing either require certification infrastructure, or require routers to rewrite complete IP addresses, which is inefficient because it requires per-host information in routers. The present invention provides a system and method for multi-homing by cryptographically binding a set of IP addresses with different subnet prefixes and a common interface identifier. The invention enables hosts to prove ownership of a set of IP address to a correspondent host without relying on certification infrastructure, while at the same time enabling routers to efficiently exchange the IP addresses in the set by rewriting only the IP address prefixes.

In order to provide all of the aforementioned properties, hosts must be able to dynamically switch between IP addresses from ISP-dependent addressing spaces, while also enabling the access network to overwrite an IP address such that the address matches the addressing space of an ISP via which the packet is to be forwarded.

Thus, in one embodiment, the present invention is directed to a method in a generating host of generating a plurality of addresses for access multi-homing in an access network, wherein each address comprises a first address part and a second address part. The generating host may obtain from the network, a plurality of first address parts corresponding to the plurality of addresses, wherein each of the first address parts identifies the generating host's point of network attachment. The generating host then processes the plurality of first address parts to generate a second address part, wherein the second address part identifies the generating host at the generating host's point of network attachment. The generating host also concatenates the plurality of first address parts with the second address part to generate the plurality of addresses, wherein the second address part is common to each of the plurality of addresses and cryptographically binds the addresses into a set. In one embodiment, the access network is an Internet access network, the plurality of first address parts is a plurality of IPv6 subnet prefixes, and the second address part is an IPv6 interface identifier.

In another embodiment, the present invention is directed to a method in a generating host of generating a plurality of IP addresses for access multi-homing in an Internet access network. The method includes the steps of obtaining from the network a plurality of IPv6 subnet prefixes for a plurality of available Internet Service Providers, ISPs; and cryptographically binding the plurality of IPv6 subnet prefixes with a single IPv6 interface identifier.

In another embodiment, the present invention is directed to a method in a verifying host of verifying that a set of IP addresses belongs together. The method includes the steps of obtaining from the generating host a plurality of IPv6 subnet prefixes for a plurality of available ISPs and a first IPv6 interface identifier generated by the generating host; generating by the verifying host, a second IPv6 interface identifier utilizing the plurality of IPv6 subnet prefixes received from the generating host; and comparing the first IPv6 interface identifier with the second IPv6 interface identifier. If the first IPv6 interface identifier is equal to the second IPv6 interface identifier, the verification is determined to be successful. If the first IPv6 interface identifier is not equal to the second IPv6 interface identifier, the verification is determined to have failed.

In another embodiment, the present invention is directed to a generating host for generating a plurality of addresses for access multi-homing in an access network. The generating host includes means for obtaining from the network a plurality of first address parts corresponding to the plurality of addresses; and means for cryptographically binding the plurality of first address parts with a single second address part. In one embodiment, the access network is an Internet access network, the plurality of first address parts is a plurality of IPv6 subnet prefixes, and the second address part is an IPv6 interface identifier.

In another embodiment, the present invention is directed to a verifying host for verifying that a set of IP addresses belongs together. The verifying host includes means for obtaining from the generating host a plurality of IPv6 subnet prefixes for a plurality of available ISPs, and a first IPv6 interface identifier generated by the generating host; means for generating by the verifying host, a second IPv6 interface identifier utilizing the plurality of IPv6 subnet prefixes received from the generating host; and a comparison unit for comparing the first IPv6 interface identifier with the second IPv6 interface identifier. The comparison unit determines that the verification was successful if the first IPv6 interface identifier is equal to the second IPv6 interface identifier, and determines that the verification failed if the first IPv6 interface identifier is not equal to the second IPv6 interface identifier.

In another embodiment, the present invention is directed to a system for access network multi-homing in an Internet access network. The system includes means for enabling a host to dynamically select an IP address for an ISP from a plurality of IP addresses from ISP-dependent addressing spaces; and means for enabling the access network to overwrite the IP address selected by the host such that the address matches the addressing space of an ISP via which the access network intends to forward packets.

DETAILED DESCRIPTION

Figure 1:
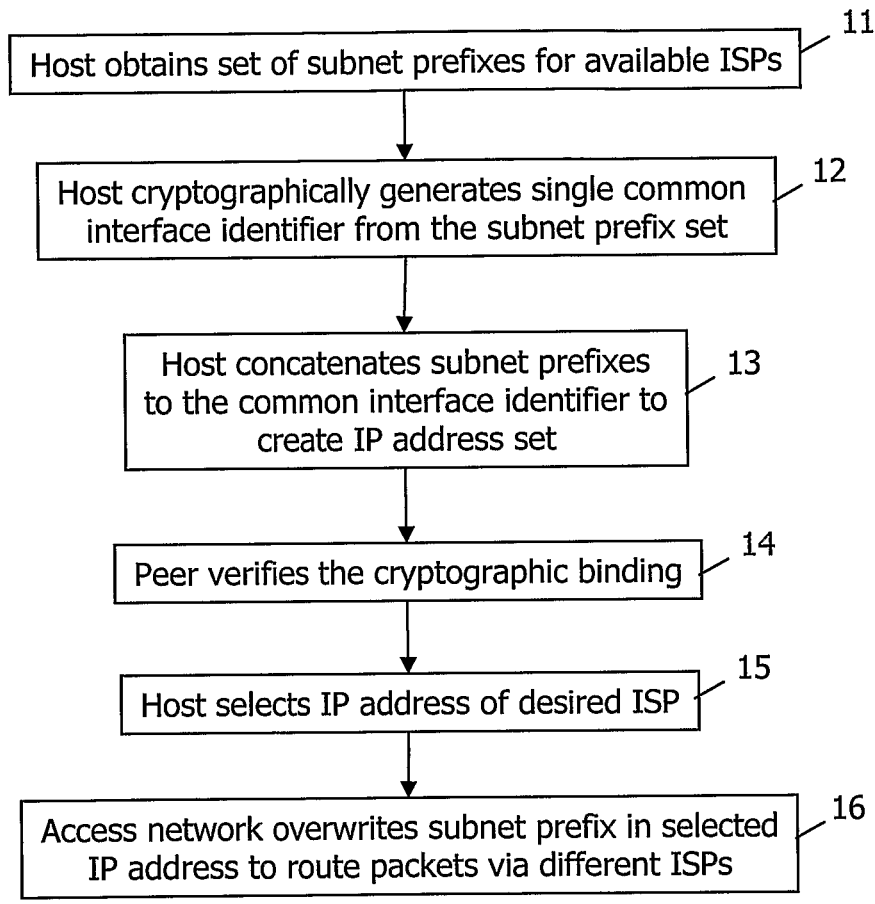
FIG. 1 is a flow chart illustrating an exemplary embodiment of the method of the present invention.

The ability for a host to use different IP addresses interchangeably when communicating with a peer could be misused by a malicious host to communicate with the peer on behalf of a victim host if appropriate security measures are not in place. Such an "impersonation attack" calls for the malicious host to register with the peer, a set of IP addresses that includes the victim host's IP address and an IP address at which the malicious host itself is reachable. The malicious host then exchanges packets with the peer via its own IP address, while transport protocols and applications on the peer see the victim host's IP address and hence assume they are communicating with the victim host. The interface identifier of the malicious host's IP address has to be the same as that of the victim host's IP address.

To protect hosts from falling victim to such impersonation attacks, peers must be able to verify that all IP addresses in a set belong to the same host. The present invention provides this verifiability through a cryptographic binding between the subnet prefixes of the IP addresses in a set and the common interface identifier of these IP addresses. Hosts create the cryptographic binding when generating an IP address set, and peers verify it. This makes it infeasible for a malicious host to create an IP address set that contains both a victim host's IP address and an IP address at which the malicious host is reachable.

Only the subnet prefix of an IP address determines the ISP to which the IP address belongs. Therefore, it is sufficient for the access network to replace only the subnet prefix in order to overwrite an IP address selected by the host such that the address matches the addressing space of an ISP via which the packet is to be forwarded. For this to work, a host must configure a set of IP addresses, each with a subnet prefix from one of the available ISPs, which all have the same interface identifier. However, to enable the host to use the IP address set interchangeably when communicating with a remote peer, the host must be able to prove to the peer that the host is the legitimate owner of all of the IP addresses in the set. Each IP address must therefore be "unspoofably" bound to the rest of the IP addresses in the set.

Current technology enables a host to securely bind a set of IPv6 addresses to each other by generating the interface identifier for each of these IPv6 addresses cryptographically. The shortfall of this is that it results in a different interface identifier for each IPv6 address.

An embodiment of the present invention enables a host to configure a set of IP address—one per ISP subnet prefix—with a common interface identifier. The common interface identifier cryptographically binds the IP addresses in the set together. This binding enables the host to provide evidence to a peer that the host is the legitimate owner of all the IP addresses in the set. Provided that hosts (and their peers) are able to use IPv6 addresses in such a set interchangeably, the access network can overwrite the subnet prefix in IPv6 addresses in order to route the packets via a different ISP if desired.

Thus, the invention enables a host to generate a set of IP addresses with a common interface identifier, which is cryptographically bound to the set of subnet prefixes used for the IP addresses. In one embodiment, the interface identifier is generated as a cryptographic hash on a string that includes the concatenation of the subnet prefixes of the different IP addresses. The input string for the hash function may also include additional data, such as a random number that enables the host to influence the result of the hash function in case the result would otherwise equal an interface identifier that is already in use on the host's access link.

FIG. 1 is a flow chart illustrating the steps of an exemplary embodiment of the method of the present invention. At step 11, a host obtains a set of IPv6 subnet prefixes for available ISPs from the network. At step 12, the host cryptographically generates a single common IPv6 interface identifier for the IP address set. In an exemplary embodiment, the host generates the interface identifier as a cryptographic hash on a string that includes the concatenation of the subnet prefixes of the different IP addresses. At step 13, the host concatenates the subnet prefixes of the IP addresses in the set to the common interface identifier to create a set of IP addresses. Thus, the IP addresses are cryptographically bound to the set of IPv6 subnet prefixes (and, as a consequence, they are also bound to each other). Also note that the IPv6 subnet prefix of any particular IP address in the set is not emphasized over other subnet prefixes in the generation of the interface identifier for that IP address. This makes it possible to generate a single common interface identifier for all IP addresses in the set. At step 14, a remote peer verifies the cryptographic binding. Once the cryptographic binding is verified, at step 15, the IP address of any desired ISP may begin to be used. At step 16, the access network can overwrite the subnet prefix in the selected IP address in order to route packets via different ISPs.

When the host generates the interface identifier as a cryptographic hash on a string that includes the concatenation of the subnet prefixes of the different IP addresses, the input string for the hash function may also include additional data, such as a random number that enables the host to influence the result of the hash function in case the result would otherwise equal an interface identifier that is already in use on the host's access link.

The exemplary technique described herein may be used in one embodiment to create a cryptographic binding between different subnet prefixes and a common interface identifier for a set of IPv6 addresses. This is based on the generation and verification algorithms for Cryptographically Generated Addresses (CGAs) (see T. Aura, *Cryptographically Generated Addresses (CGA)*, RFC 3972) and Hash-Based Addresses (HBAs) (see M. Bagnulo, *Hash Based Addresses (HBA)*, draft-ietf-shim6-hba-05.txt). However, both of these algorithms produce IPv6 addresses with different interface identifiers, because the procedure for generating the interface identifier for a particular IPv6 address puts special emphasis on the subnet prefix from that IPv6 address. The present invention differs in that it yields a single interface identifier for IPv6 addresses with different subnet prefixes, which eventually form an IPv6 address set. For this, each IPv6 address in a set must be created based on the same set of parameters, that is, the set of parameters must not be tailored to the subnet prefix of a particular IPv6 address.

Figure 2A:
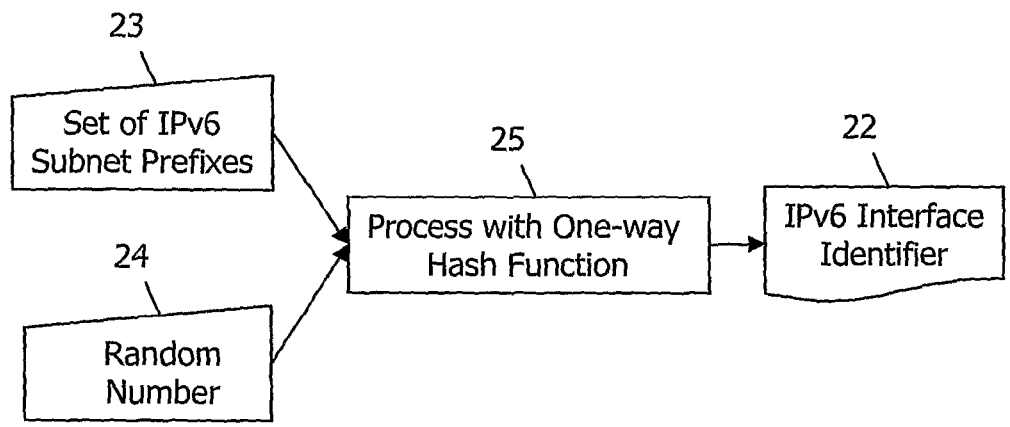
FIGS. 2A-2B are portions of a flow chart illustrating the steps of an exemplary embodiment of a process of generating a set of IPv6 addresses in accordance with the teachings of the present invention.
Figure 2B:
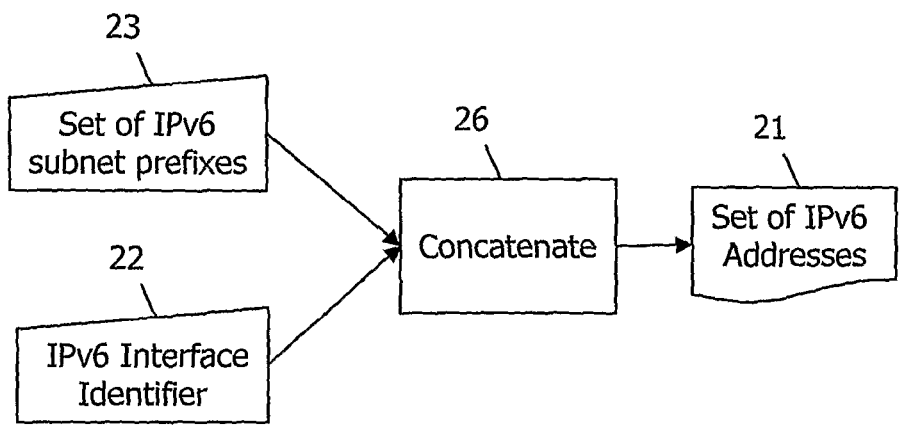

FIGS. 2A-2B are portions of a flow chart illustrating the steps of an exemplary embodiment of a process of generating a set of IPv6 addresses 21 in accordance with the teachings of the present invention. FIG. 2A illustrates a process of generating an IPv6 interface identifier 22, and FIG. 2B illustrates a process of utilizing the IPv6 interface identifier to generate the set of IPv6 addresses.

Referring first to FIG. 2A, a set of IPv6 subnet prefixes 23 and a random number 24 are processed with a one-way hash function 25 to produce the IPv6 interface identifier 22.

Referring now to FIG. 2B, the set of IPv6 subnet prefixes 23 and the IPv6 interface identifier 22 are concatenated at 26 to produce the set of IPv6 addresses 21.

Specifically, this technique requires a host to generate an IPv6 address set similar to the procedure described in Section 6 of M. Bagnulo, *Hash Based Addresses (HBA)*, draft-ietf-shim6-hba-05.txt. The following shows the procedure as used in this invention. This procedure differs from the procedure in Section 6 of M. Bagnulo, *Hash Based Addresses (HBA)*, draft-ietf-shim6-hba-05.txt, in two aspects: first, that a single, common IPv6 interface identifier is generated for all IP addresses in steps 6 and 7, rather than a separate interface identifier per IP address; and second, that a single CGA Parameters data structure is generated for all IP addresses in step 9, rather than a separate CGA Parameters data structure per IP address. Apart from these two exceptions, the procedure shown in the following is directly taken from Section 6 of M. Bagnulo, *Hash Based Addresses (HBA)*, draft-ietf-shim6-hba-05.txt. Thus, it takes a Sec security parameter as an additional input, and a CGA Parameters data structure as an additional output. The Sec security parameter serves to scale the cryptographic strength of the generated IPv6 address set, and the CGA Parameters data structure provides a canonical format for peers to exchange the components required for cryptographic IP address verification.

1. Concatenate the IPv6 subnet prefixes for which IP addresses are to be generated.

2. Generate two modifiers randomly or pseudo-randomly. One modifier is to be 128 bits long, the other 384 bits. (The longer modifier will serve as a replacement for a public key, which is used by the same algorithm when generating a CGA.)

3. Concatenate from left to right the 128-bit modifier, 9 zero octets, the 384-bit modifier, and the concatenation of IPv6 subnet prefixes. Execute the SHA-1 algorithm on the concatenation. Take the 112 leftmost bits of the SHA-1 hash value. Let the result be Hash2.

4. Compare the 16*Sec leftmost bits of Hash2 with zero. If they are all zero (or if Sec=0), continue with step (5). Otherwise, increment the 128-bit modifier by one and go back to step (3).

5. Set the 8-bit collision count to zero.

6. Concatenate from left to right the final 128-bit modifier value, 8 zero octets, the collision count, the 384-bit modifier and the concatenation of IPv6 subnet prefixes. Execute the SHA-1 algorithm on the concatenation. Take the 64 leftmost bits of the SHA-1 hash value. Let the result be Hash1.

7. Form a 64-bit interface identifier from Hash1 by writing the value of Sec into the three left-most bits and by setting bits 6 and 7 (i.e., the "u" and "g" bits) both to zero.

8. For i=1 to n (number of IPv6 subnet prefixes) do:
  a. Generate IPv6 address #i by concatenating the i-th IPv6 subnet prefix and the previously created interface identifier to form a 128-bit IPv6 address with the subnet prefix to the left and interface identifier to the right as in a standard IPv6 address [6].
  b. Perform duplicate address detection if required. If an address collision is detected, increment the collision count by one and go back to step (6). However, after three collisions, stop and report the error.

9. Form the CGA Parameters data structure by concatenating from left to right the final 128-bit modifier, 8 zero octets, the final collision count value, the 384-bit modifier, and the concatenation of IPv6 subnet prefixes.

Figure 3:
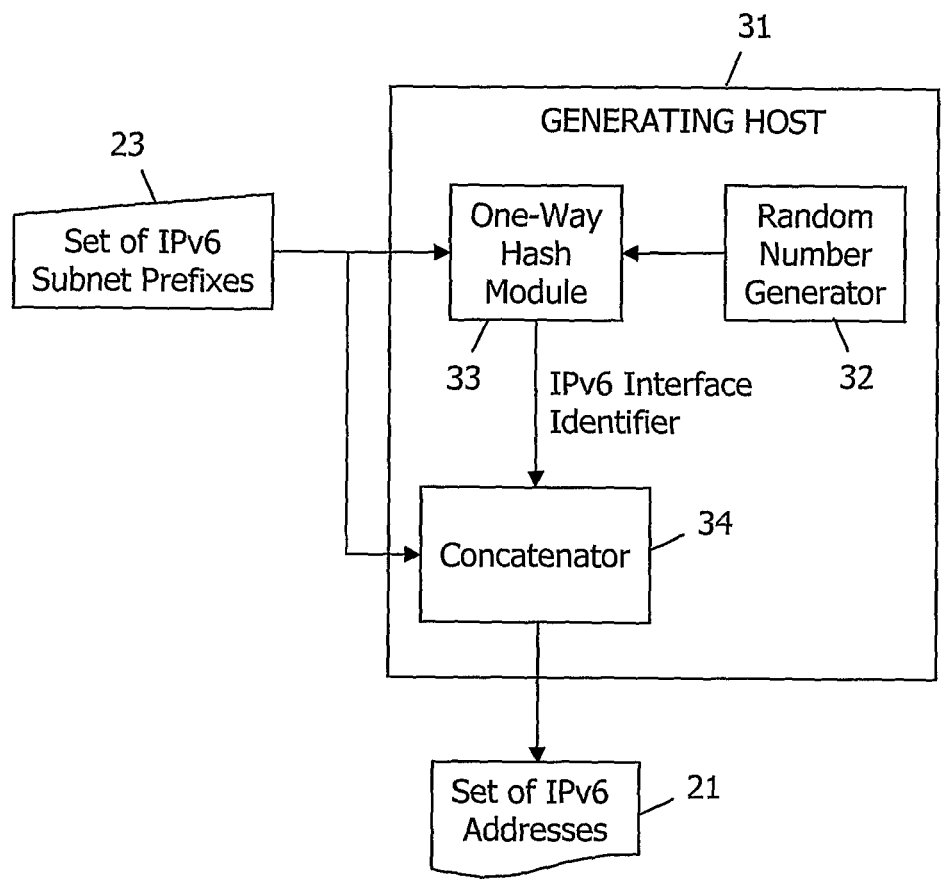
FIG. 3 is a simplified block diagram of an exemplary embodiment of a generating host for generating the set of IPv6 addresses.

FIG. 3 is a simplified block diagram of an exemplary embodiment of a generating host 31 for generating the set of IPv6 addresses 21. The generating host may include a random number generator 32, a module 33 for processing the one-way hash function 25, and a concatenator 34. The set of IPv6 subnet prefixes 23 is input to the generating host, and the random number generator generates the random number 24. The subnet prefixes and the random number are supplied to the one-way hash module, which processes them utilizing the one-way hash function 25 to produce the IPv6 interface identifier 22. The IPv6 interface identifier and the set of IPv6 subnet prefixes are input to the concatenator 34, which concatenates them to produce the set of IPv6 addresses 21.

The IPv6 address sets created according to the process described above may be referred to as "IP(v6) address bunches". Once the address bunches are created, a peer (verifying host) verifies the cryptographic binding between the different subnet prefixes and the common interface identifier.

Figure 4:
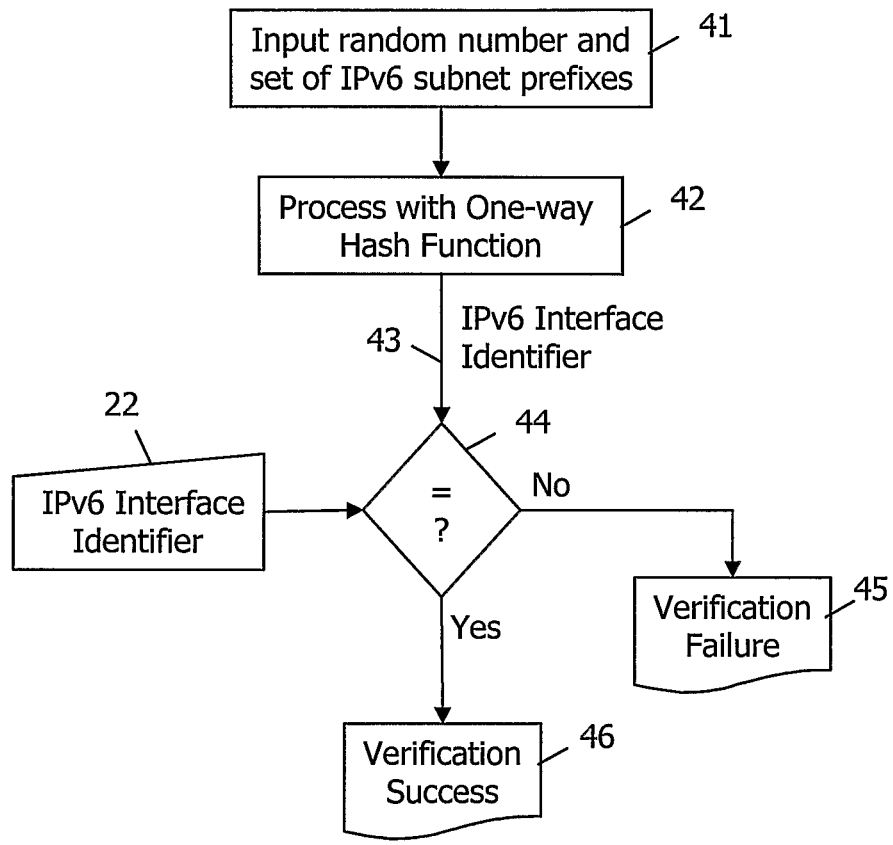
FIG. 4 is a flow chart illustrating the steps of an exemplary embodiment of a process of verifying the cryptographic binding between the different subnet prefixes and the common interface identifier.

FIG. 4 is a flow chart illustrating the steps of an exemplary embodiment of a process of verifying the cryptographic binding between the different subnet prefixes and the common interface identifier. The verification is performed according to Section 5 of T. Aura, Cryptographically Generated Addresses (CGA), RFC 3972, with the exceptions that step 2 is omitted so that no particular subnet prefix is emphasized in the verification of an IPv6 address. Apart from this exception, the procedure shown in the following is directly taken from Section 5 of T. Aura, Cryptographically Generated Addresses (CGA), RFC 3972. Thus, it takes a CGA Parameters data structure as an additional input.

1. Check that the collision count in the CGA Parameters data structure is 0, 1, or 2. The CGA verification fails if the collision count is out of the valid range.

2. [This step is removed. It is not necessary for the purpose of this invention, because this invention does not emphasize the subnet prefix of a particular IPv6 address in the verification of that IPv6 address.]

3. Execute the SHA-1 algorithm on the CGA Parameters data structure. Take the 64 left-most bits of the SHA-1 hash value. Let the result be Hash1.

4. Compare Hash1 with the interface identifier (i.e., the right-most 64 bits) of the address. Differences in the three left-most bits and in bits 6 and 7 (i.e., the "u" and "g" bits) are ignored. If the 64-bit values differ (other than in the five ignored bits), the CGA verification fails.

5. Read the security parameter Sec from the three left-most bits of the 64-bit interface identifier of the address. (Sec is an unsigned 3-bit integer.)

6. Concatenate from left to right the 128-bit modifier, 9 zero octets, the 384-bit modifier, and the concatenation of IPv6 subnet prefixes. Execute the SHA-1 algorithm on the result. Take the 112 left-most bits of the SHA-1 hash value. Let the result be Hash2.

7. Compare the 16*Sec left-most bits of Hash2 with zero. If any one of them is non-zero, the CGA verification fails. Otherwise, the verification succeeds. (If Sec=0, the CGA verification never fails at this step.)

Note that, although the above modifications effectively eliminate the Subnet Prefix field in the original CGA Parameters data structure defined in T. Aura, Cryptographically Generated Addresses (CGA), RFC 3972, the concatenation of IPv6 subnet prefixes, which forms part of the CGA Parameters data structure still lists the set of subnet prefixes in use in an IPv6 address set. This upholds the cryptographic binding between the subnet prefixes and the interface identifier in the set.

Referring to FIG. 4, at step 41, the random number 24 and the set of IPv6 subnet prefixes 23 are input to the verifying host. At step 42, the verifying host processes the inputs with the one-way hash function 25 to produce a new calculation of the IPv6 interface identifier 43. At step 44, the new calculation of the IPv6 interface identifier 43 is compared with the IPv6 interface identifier 22 calculated by the generating host 31. If the comparison shows the two interface identifiers are not equal, the verification fails at step 45. If the comparison shows the two interface identifiers are equal, the verification succeeds at step 46.

Figure 5:
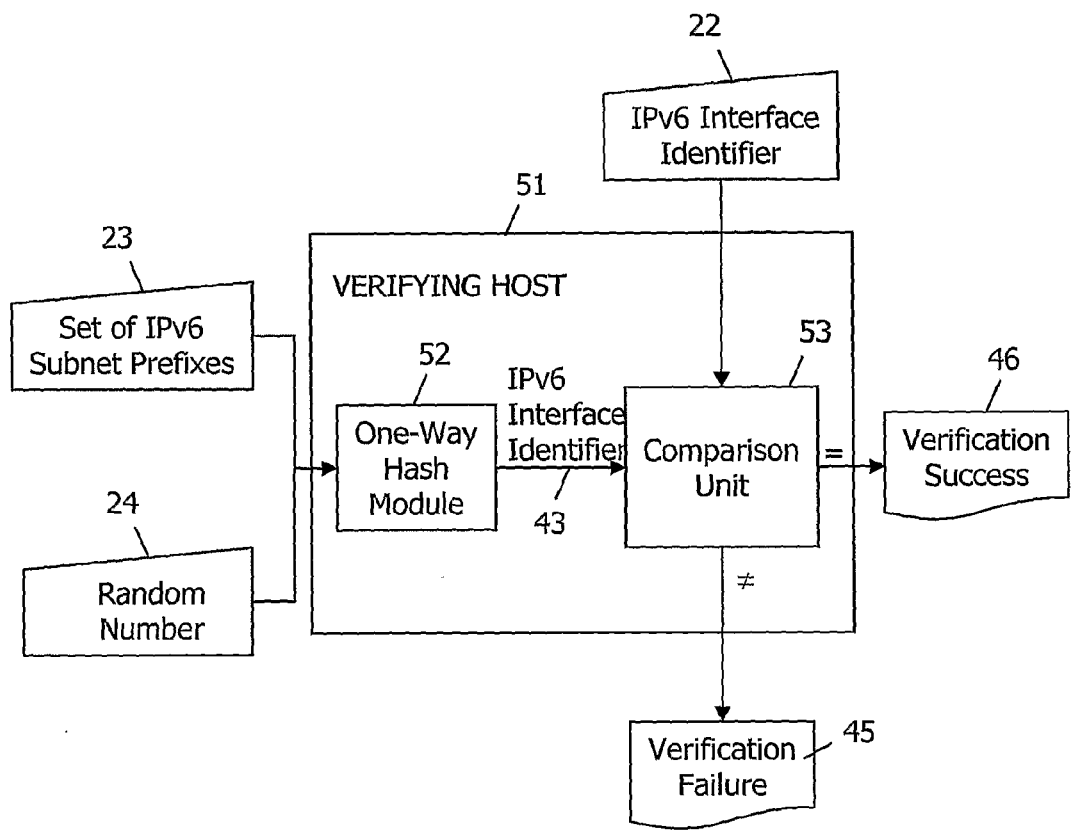
FIG. 5 is a simplified block diagram of an exemplary embodiment of a verifying host for verifying the cryptographic binding between the different subnet prefixes and the common interface identifier in an IPv6 address set.

FIG. 5 is a simplified block diagram of an exemplary embodiment of a verifying host 51 for verifying the cryptographic binding between the different subnet prefixes and the common interface identifier in an IPv6 address set. A one-way hash module 52 processes the set of IPv6 subnet prefixes 23 and the random number 24 to produce the IPv6 interface identifier 43. A comparison unit 53 compares the IPv6 interface identifier 43 with the IPv6 interface identifier 22 calculated by the generating host 31. If the comparison shows the two interface identifiers are not equal, the verifying host outputs an indication 45 that the verification failed. If the comparison shows the two interface identifiers are equal, the verifying host outputs an indication 46 that the verification was successful.

Although the present invention has been described in the specific context of IPv6 addresses, the invention is not limited to this specific case, but also applies to other kinds of "addresses" that include, in any order:

1. An address part A that the host cannot select arbitrarily; and

2. An address part B that the host is able to select arbitrarily.

Typically, address part A is assigned by the network in such a way that it can be used to find the host's point of network attachment. Address part B is used to identify the host at that point of network attachment. In the specific case of IPv6 addresses, address part A is a subnet prefix, and address part B is an interface identifier.

In the generalized case, the generation and verification of a cryptographically bound set of addresses proceeds according to the same generation and verification algorithms that are used in the specific case of IPv6 addresses, although the term "subnet prefix" then refers to an address part A, and the term "interface identifier" refers to an address part B.

A cryptographically bound set of addresses for different address parts A may be generated by forming a common address part B—to be used by all addresses in the set—in the same way as a common interface identifier is generated in the specific case of a cryptographically bound IPv6 address set. The different address parts A then take the role the subnet prefixes would play in the specific case of IPv6 addresses. The length of hash values used in the generation of the address set may have to be adjusted if the length of address parts A and B differ from the length of IPv6 subnet prefixes and interface identifiers, respectively.

Similarly, in the generalized case, the cryptographic binding of an address set can be verified in the same way as it is in the specific case of IPv6 addresses. The different address parts A then take the role the subnet prefixes would play in the specific case of IPv6 addresses, and the common address part B takes the role the interface identifier would play in the specific case of IPv6 addresses. Again, the length of hash values used in the verification of the address set may have to be adjusted if the length of address parts A and B differ from the length of IPv6 subnet prefixes and interface identifiers, respectively.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method in a generating host of generating a plurality of addresses for access multi-homing in an access network, wherein each address comprises a first address part and a second address part, said method comprising the steps of:
   obtaining from the network a plurality of first address parts corresponding to the plurality of addresses for access multi-homing in the access network, wherein each of the first address parts identifies the generating host's point of network attachment and the plurality of first address parts is a plurality of subnet prefixes;
   processing the plurality of first address parts to generate a single cryptographic second address part, wherein the single cryptographic second address part identifies the generating host at the generating host's point of network attachment;
   concatenating each of the plurality of first address parts with the single cryptographic second address part to generate the plurality of addresses, wherein the single cryptographic second address part is common to each of the plurality of addresses and defines an address set; and
   cryptographically binding the plurality of addresses with different subnet prefixes which enables hosts to prove ownership of a set of IP addresses to a correspondent host without relying on certification infrastructure, while also enabling routers to efficiently exchange IP addresses in the address set by rewriting only the IP addresses' prefixes,
   wherein the processing step includes processing each of the plurality of first address parts together with a random number utilizing a one-way hash function to create a cryptographic hash.

2. The method as recited in claim 1, wherein the concatenating step includes concatenating the cryptographic hash on a string that includes the concatenation of the plurality of first address parts.

3. The method as recited in claim 1, further comprising sending the plurality of first address parts and the second address part to a verifying host for verification that the set of addresses belongs to the generating host.

4. The method as recited in claim 1, wherein the access network is an Internet access network, the plurality of first address parts is a plurality of IPv6 subnet prefixes, and the second address part is an IPv6 interface identifier.

5. A method in a generating host of generating a plurality of Internet Protocol (IP) addresses for access multi-homing in an Internet access network, said method comprising the steps of:
   obtaining from the network a plurality of IPv6 subnet prefixes for a plurality of available Internet Service Providers (ISPs); and
   cryptographically binding the addresses for access multi-homing in the Internet access network with different IPv6 subnet prefixes which enables hosts to prove ownership of a set of IP addresses to a correspondent host without relying on certification infrastructure, while also enabling routers to efficiently exchange IP addresses in the address set by rewriting only the IP addresses' prefixes,
   wherein the step of cryptographically binding the plurality of IPv6 subnet prefixes includes the steps of:
      processing the plurality of IPv6 subnet prefixes together with a random number utilizing a one-way hash function to generate an IPv6 interface identifier as a cryptographic hash; and
      concatenating the cryptographic hash on a string that includes the concatenation of the plurality of IPv6 subnet prefixes.

6. The method as recited in claim 5, further comprising sending the plurality of IPv6 subnet prefixes and the IPv6 interface identifier to a verifying host for verification that the set of IP addresses belongs to the generating host.

7. A method in a verifying host of verifying that a set of Internet Protocol (IP) addresses for access multi-homing in an access network belongs together, said method comprising the steps of:
   obtaining from a generating host a plurality of IPv6 subnet prefixes for a plurality of available Internet Service Providers (IP) and a first IPv6 interface identifier common to each of the IPv6 subnet prefixes, wherein the first IPv6 interface identifier is cryptographically generated by the generating host utilizing the IP addresses for access multi-homing in the access network and the plurality of IPv6 subnet prefixes;
   cryptographically generating by the verifying host, a second IPv6 interface identifier utilizing the IP addresses and the plurality of IPv6 subnet prefixes received from the generating host;
   comparing the first IPv6 interface identifier with the second IPv6 interface identifier;
   determining that the verification was successful if the first IPv6 interface identifier is equal to the second IPv6 interface identifier; and
   determining that the verification failed if the first IPv6 interface identifier is not equal to the second IPv6 interface identifier which enables hosts to prove ownership of a set of IP addresses to a correspondent host without relying on certification infrastructure, while also enabling routers to efficiently exchange IP addresses in the address set by rewriting only the IP addresses' prefixes,
   wherein the step of generating a second IPv6 interface identifier includes processing the plurality of IPv6 subnet prefixes together with a random number utilizing a one-way hash function to generate the second IPv6 interface identifier.

8. A generating host for generating a plurality of addresses for access multi-homing in an access network, said generating host comprising:
   means for obtaining from the network a plurality of first address parts corresponding to the plurality of addresses for access multi-homing in the access network; and
   means for cryptographically binding each of the plurality of first address parts with different subnet prefixes which enables hosts to prove ownership of a set of IP addresses to a correspondent host without relying on certification infrastructure, while also enabling routers to efficiently exchange IP addresses in the address set by rewriting only the IP addresses' prefixes,
   wherein the access network is an Internet access network, the plurality of first address parts is a plurality of IPv6 subnet prefixes, and wherein the means for cryptographically binding includes:
a one-way hash module for processing the plurality of IPv6 subnet prefixes together with a random number to generate an IPv6 interface identifier as a cryptographic hash; and
a concatenator for concatenating the cryptographic hash on a string that includes the concatenation of the plurality of IPv6 subnet prefixes.

9. The generating host as recited in claim 8, further comprising means for sending the plurality of IPv6 subnet prefixes and the IPv6 interface identifier to a verifying host for verification that the set of addresses belongs together.

10. A verifying host for verifying that a set of Internet Protocol, IP, addresses for access multi-homing in an access network belongs together, said verifying host comprising:
means for obtaining from a generating host a plurality of IPv6 subnet prefixes for a plurality of available Internet Service Providers (ISPs) and a first IPv6 interface identifier common to each of the IPv6 subnet prefixes, wherein the first IPv6 interface identifier is cryptographically generated by the generating host utilizing the plurality of IPv6 subnet prefixes;
means for cryptographically generating by the verifying host, a second IPv6 interface identifier utilizing the IP addresses for access multi-homing in the access network and the plurality of IPv6 subnet prefixes received from the generating host; and
a comparison unit for comparing the first IPv6 interface identifier with the second IPv6 interface identifier, wherein the comparison unit determines that the verification was successful if the first IPv6 interface identifier is equal to the second IPv6 interface identifier, and determines that the verification failed if the first IPv6 interface identifier is not equal to the second IPv6 interface identifier which enables hosts to prove ownership of a set of IP addresses to a correspondent host without relying on certification infrastructure, while also enabling routers to efficiently exchange IP addresses in the address set by rewriting only the IP addresses' prefixes,
wherein the means for generating a second IPv6 interface identifier includes a one-way hash module for processing the plurality of IPv6 subnet prefixes together with a random number to generate the second IPv6 interface identifier.

11. A system for access network multi-homing in an Internet access network, said system comprising:
means for enabling a host to dynamically select an IP address for an Internet Service Provider (ISP) from a plurality of IP addresses from ISP dependent addressing spaces; and
means for enabling the access network to overwrite the IP address selected by the host such that the address matches the addressing space of an ISP via which the access network intends to forward packets;
wherein the means for enabling a host to dynamically select an IP address for an ISP includes means within the host for configuring a set of IP addresses for access multi-homing in the Internet access network, each IP address having a different subnet prefix from one of the available ISPs, and all of the IP addresses being cryptographically bound to the respective different subnet prefixes which enables hosts to prove ownership of a set of IP addresses to a correspondent host without relying on certification infrastructure, while also enabling routers to efficiently exchange IP addresses in the address set by rewriting only the IP addresses' prefixes,
wherein the IP addresses are cryptographically bound to the respective different subnet prefixes by concatenation of a cryptographic hash on a string that includes a concatenation of the different subnet prefixes, the cryptographic hash being a one-way hash function performed on the string that includes the concatenation of the different subnet prefixes.

12. The system as recited in claim 11, wherein the means for enabling the access network to overwrite the selected IP address includes means for the access network to replace the subnet prefix of the selected IP address with a different subnet prefix.

13. The system as recited in claim 11, further comprising means for sending the cryptographically bound set of IP addresses to a peer for verification that all of the addresses in the set belong together.

* * * * *